US012139343B2

(12) United States Patent
Morris et al.

(10) Patent No.: US 12,139,343 B2
(45) Date of Patent: Nov. 12, 2024

(54) CONVEYOR COMPONENT MONITORING

(71) Applicant: COLORADO CONVEYORS, INC., Breckenridge, CO (US)

(72) Inventors: Bart Daniel Morris, Woodbridge (AU); Muhammad Musabb Alam Afridi, Kensington (AU); Ronald Hapgood-Strickland, Duncraig (AU)

(73) Assignee: COLORADO CONVEYORS, INC., Breckenridge, CO (US)

( * ) Notice: Subject to any disclaimer, the term of this patent is extended or adjusted under 35 U.S.C. 154(b) by 63 days.

(21) Appl. No.: 17/782,793

(22) PCT Filed: Nov. 19, 2020

(86) PCT No.: PCT/AU2020/051249
§ 371 (c)(1),
(2) Date: Jun. 6, 2022

(87) PCT Pub. No.: WO2021/108835
PCT Pub. Date: Jun. 10, 2021

(65) Prior Publication Data
US 2023/0009976 A1    Jan. 12, 2023

(30) Foreign Application Priority Data
Dec. 6, 2019   (AU) ................... 2019904631

(51) Int. Cl.
*B65G 43/02*   (2006.01)
*B65G 11/16*   (2006.01)
(Continued)

(52) U.S. Cl.
CPC ............. *B65G 43/02* (2013.01); *B65G 11/16* (2013.01); *B65G 47/18* (2013.01); *B65G 47/44* (2013.01);
(Continued)

(58) Field of Classification Search
CPC ........ B65G 11/16; B65G 15/00; B65G 39/02; B65G 47/18; B65G 47/44; B65G 43/02
See application file for complete search history.

(56) References Cited

U.S. PATENT DOCUMENTS 11,306,775 B2 *   4/2022   Riedel .................... F16C 43/04
11,608,230 B2 *   3/2023   Baggio ............... F16C 33/7886
(Continued)

FOREIGN PATENT DOCUMENTS

CN      106429299 B    9/2019
CN      110375831 A    10/2019
(Continued)

OTHER PUBLICATIONS

International Search Report and Written Opinion in PCT Application No. PCT/AU2020/051249, mailed Jan. 19, 2021, 15 pages.
(Continued)

*Primary Examiner* — James R Bidwell
(74) *Attorney, Agent, or Firm* — Leason Ellis LLP

(57) ABSTRACT

A sensing device and system is configured for sensing the temperature, vibration or other characteristics of conveyor rollers and transmitting data pertaining to the condition of the rollers to a remote server to indicate maintenance requirements. The system is configured to only transmit data when an abnormal characteristic is sensed, so that power and data requirements of the monitoring system is minimized. Each sensing device is installed in the shaft of a conveyor roller with its transmission antenna positioned to protrude from an end of the roller. A central server receives the transmitted sensor data and a user interface provides maintenance information to a user so that any required maintenance of a roller can be initiated.

17 Claims, 18 Drawing Sheets

(51) Int. Cl.
  *B65G 15/00* (2006.01)
  *B65G 47/18* (2006.01)
  *B65G 47/44* (2006.01)

(52) U.S. Cl.
  CPC ...... *B65G 15/00* (2013.01); *B65G 2203/0275* (2013.01); *B65G 2203/042* (2013.01)

(56) References Cited

U.S. PATENT DOCUMENTS

2019/0203764 A1\* 7/2019 Van der Ham ....... F16C 33/366
2019/0203773 A1  7/2019 Den Haak et al.

FOREIGN PATENT DOCUMENTS

| CN | 112722749 | \* | 12/2020 | ............ B65G 43/00 |
| WO | 2015/042661 A2 | | 4/2015 | |
| WO | 2016/019431 A1 | | 2/2016 | |
| WO | 2017/190200 A1 | | 11/2017 | |
| WO | 2019/018883 A1 | | 1/2019 | |
| WO | 2019/157606 | \* | 8/2019 | ............ B65G 43/02 |
| WO | 2019/157606 A1 | | 8/2019 | |
| WO | 2019/191806 A1 | | 10/2019 | |
| WO | 2020/102921 A1 | | 5/2020 | |

OTHER PUBLICATIONS

International Preliminary Report on Patentability in PCT Application No. PCT/AU2020/051249, mailed Mar. 31, 2022, 8 pages.

\* cited by examiner

CONVEYOR COMPONENT MONITORING

CROSS REFERENCE TO RELATED APPLICATIONS

This patent application is a U.S. National Phase Application under 35 U.S.C. § 371 of International Patent Application No. PCT/AU2020/051249, filed on Nov. 19, 2020, which claims priority from Australian Patent Application No. 2019904631, filed on Dec. 6, 2019, all of which are incorporated by reference, as if expressly set forth in their respective entireties herein.

BACKGROUND OF THE INVENTION

The present invention relates to a system and method for monitoring conveyor components, and in particular, to a system and method for sensing at least one characteristic of at least one conveyor component, to indicate when maintenance may be required to be performed.

The present invention also relates to a conveyor roller, liner or other component, which incorporates at least one sensor therein, to sense characteristics such as temperature, noise or vibration, so as to indicate a status condition of the component, and in particular whether maintenance may be required to be undertaken.

DESCRIPTION OF THE PRIOR ART

Any reference herein to known prior art does not, unless the contrary intention appears, constitute an admission that such prior art is commonly known by persons skilled in the art to which the invention relates, at the priority date of this application.

Conveyor Systems are used in a number of industrial situations, including in manufacturing, production and mining operations for moving various materials from one location to another.

Such conveyor systems take a variety of forms, and typically incorporate a number of component parts.

For example, in mining applications for conveying coal or other minerals, the conveyor components of a conveyor system may typically include the conveyor rollers, including one or more drive pulley/roller which drives a conveyor belt, a plurality of carrying idlers which support the belt carrying the mineral or other load to be conveyed, return rollers to support the returning portion of the endless conveyor belt, and, a take-up roller and its associated bend rollers to ensure that the belt remains taut during operation. These conveyor rollers have component parts, such as their bearings, which are prone to wear out and/or become damaged due to dust infiltration and the like.

Such conveyor systems also typically include a load chute, via which the coal or other mineral to be conveyed is supplied to one end of the conveyor belt, and, a discharge chute, via which the conveyed mineral is discharged at the other end of the conveyor belt. These chutes typically incorporate a liner on the working surface thereof, which is provided to minimise damage to the chute, and be more readily replaced from time to time as it wears out, rather than replacing the chute, per se.

As will be appreciated, particularly in mining operations, the conveyor system and its various component parts are typically subjected to considerable harsh treatment as they tend to operate in a generally rugged environment, and, are therefore prone to deterioration and/or catastrophic failure. This can not only lead to total shutdown of the conveyor system and hence the mining operation, which can not only cause significant loss of revenue, but, can also result in fire and/or other safety risks to the conveyor system, associated mining equipment, and, personnel.

This therefore identifies a need to monitor the condition of the various components of such conveyor systems, so as to better detect the onset of deterioration of the various components, with a view to being able to instigate remedial action at scheduled shutdowns of the conveyor system, rather than encountering spontaneous failures of the system.

SUMMARY OF THE INVENTION

The present invention seeks to overcome at least some or all of the drawbacks of the prior art.

The present invention also seeks to provide a conveyor component monitoring system and method, for monitoring at least one characteristic of at least one conveyor component.

The present invention also seeks to provide a conveyor component, such as, but not limited to, a conveyor roller or a conveyor liner, which incorporates a sensor.

The present invention also seek to provide a sensor which is adapted to monitor at least one condition of at least a conveyor component.

In one broad form, the present invention provides a conveyor component monitoring system for monitoring at least one conveyor component, the system including:
  at least one sensor associated with each said conveyor component, each sensor adapted to sense at least one characteristic of a respective conveyor component and produce sensor data representative of said sensed characteristic;
  a central server, adapted to receive said sensor data from each sensor, process said sensed data to generate status data in relation to each conveyor component; and,
  a user interface, adapted to receive said status data from said central server and provide maintenance information to a user indicative of any maintenance required to be performed on said conveyor component.

Preferably, wherein each said conveyor component is embodied as:
  a conveyor roller, idler, pulley, garland roller, etc. having a solid or hollow shaft; or,
  a liner, including a feed chute liner, discharge chute liner, crusher liner, transfer chute liner or other liner.

Preferably, each said sensor is substantially embedded in and/or integrally formed in said conveyor component and is adapted to sense a conveyor characteristic, the conveyor characteristic including any one or combination of:
  temperature;
  noise; and,
  vibration.

Also preferably, said sensor is adapted to produce sensor data representative of said sensed characteristic.

Preferably, said conveyor component includes a conveyor component identifier adapted to provide unique identification data for the respective conveyor component.

Preferably, each conveyor component includes a transmitter adapted to transmit said sensor data and/or said identification data via a communications channel, wherein said communications channel includes a wired (e.g. optical fibre) and/or wireless (e.g. Wi-Fi, Bluetooth) communications channel.

Also preferably, said transmitter is adapted to only transmit said sensor data when an abnormal characteristic is sensed by said sensor.

Preferably, said conveyor component includes a power source, including any one or combination of:
  a battery; and,
  an energy harvesting device to self-generate power.

Preferably, said transmitter includes an antenna which is positioned at or on extremity of said conveyor component so as to at least partially protrude from said conveyor component.

In a further broad form, the present invention provides, a conveyor component monitoring/sensing device, including:
  at least one sensor, integrally formed in said conveyor component, adapted to sense at least one characteristic of said conveyor component to produce sensor data representative of said sensed characteristic;
  conveyor component identification device adapted to provide unique identification data for the respective conveyor component; and,
  a transmitter adapted to transmit said sensor and identification data to a central server wherein said data is processed to generate status data in relation to the conveyor component indicative of any maintenance required to be performed on said conveyor component.

Preferably, wherein said conveyor component is embodied as:
  a conveyor roller, idler, pulley, garland roller, etc. having a solid or hollow shaft; or,
  a liner, including a feed chute liner, discharge chute liner, crusher liner, transfer chute liner or other liner.

Preferably, said sensor is substantially embedded in and/or integrally formed in said conveyor component and is adapted to sense a conveyor characteristic, the conveyor characteristic including any one or combination of:
  temperature;
  noise; and,
  vibration.

Also preferably, said sensor is adapted to produce sensor data representative of said sensed characteristic.

Preferably, said transmitter adapted to transmit said sensor data and/or said identification data via a communications channel, wherein said communications channel includes a wired (e.g. optical fibre) and/or wireless (e.g. Wi-Fi, Bluetooth) communications channel.

Preferably, said transmitter is adapted to only transmit said sensor data when an abnormal characteristic is sensed by said sensor.

Also preferably, including a power source, including any one or combination of:
  a battery; and,
  an energy harvesting device to self-generate power.

Preferably, said transmitter includes an antenna which is positioned at or on extremity of said conveyor component so as to at least partially protrude from said conveyor component.

Preferably, said device includes a housing, which is substantially in the shape of a pin or nail.

Also preferably, said housing is formed of substantially insulative material, such as hard plastics or like material.

In a further broad form, the present invention provides a conveyor component incorporating a monitoring/sensing device as hereinbefore described.

BRIEF DESCRIPTION OF THE DRAWINGS

The present invention will become more fully understood from the following detailed description of preferred but non-limiting embodiments described in connection with the accompanying drawings, wherein.

DETAILED DESCRIPTION OF THE PREFERRED EMBODIMENT(S)

Throughout the drawings, like numerals will be used to identify like features, except where expressly otherwise indicated.

The present invention incorporates a number of component parts which may be used separately or in combination. For ease of explanation the overall system and method of monitoring the conveyor system will initially be described, and thereafter, exemplary details of the various conveyor components, incorporating the monitoring/sensing parts thereof, will be thereafter described.

Conveyor Monitoring System/Method

Figure 1:
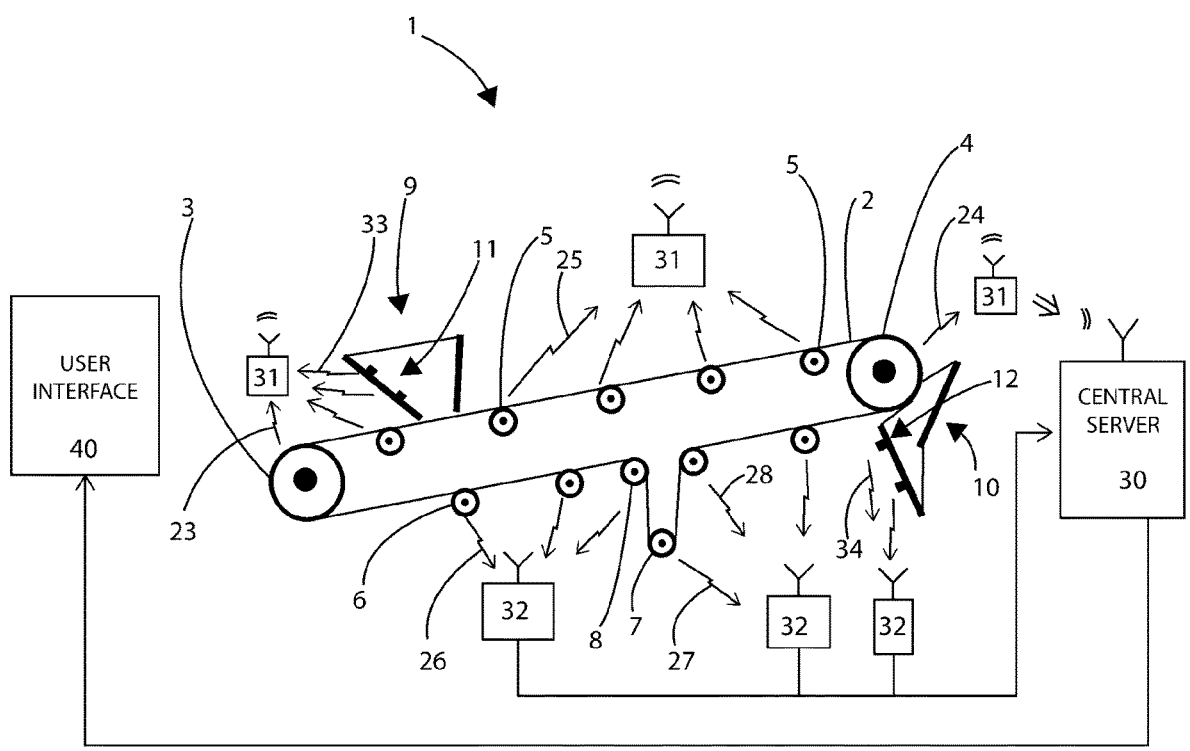
FIG. 1 illustrates a schematic diagram of a typical conveyor monitoring system in accordance with the present invention.

In FIG. 1 is shown a schematic diagram of a typical conveyor monitoring system in accordance with the present invention.

A conveyor system, generally designated by the numeral 1, typically includes a conveyor belt 2 supported by a plurality of pulleys or rollers, including one or more drive pulley/roller 3 and 4, which are powered to drive the conveyor belt 2, a plurality of carrying idlers 5 which support the belt carrying the load material, such as coal or other minerals to be conveyed, return rollers 6 to support the returning portion of the endless conveyor belt 2, and, a take-up roller 7 and its associated bend rollers 8, to ensure that the belt 2 remains taut during operation.

The conveyor system 1 also typically includes a load chute 9 via which the coal or other mineral to be conveyed is typically supplied to one end of the conveyor belt 2, and a discharge chute 10 via which the conveyed mineral is discharged at the other end of the conveyor belt 2. As will be appreciated by persons skilled in the art, each of these chutes 9 and 10 typically incorporate a liner 11 and 12, respectively, on their inner surfaces, which are provided to minimise damage to the chutes 9 and 10. This facilitates the liner 11 or 12 to be readily replaced from time to time as it wears, rather than replacing the chute 9 or 10, per se.

The conveyor system 1 of the present invention additionally incorporates various sensors associated with the various conveyor components, including the rollers 3, 4, 5, 6, 7 and 8, the liners 11 and 12.

These sensors, which will be hereinafter described in various exemplary forms, are adapted to monitor various characteristics of the rollers, liners or other conveyor components, such as temperature, noise, vibrations, etc. and then transmit data pertaining to these sensed characteristics.

Sensor data transmissions 23, 24, 25, 26, 27 and 28, may be conveyed from rollers 3, 4, 5, 6, 7, and 8 to a server 30 wherein these data transmissions may be centrally processed, and then information pertaining to the condition of the individual rollers 3, 4, 5, 6, 7 and 8 may be supplied to a user via a user interface 40.

Likewise, sensor data transmissions 33 and 34 may be conveyed from liners 11 and 12 to the server 30 for processing and supply of condition information pertaining thereto to the user interface 40.

This then facilitates the user initiating any required remedial action to restore any roller, liner or other conveyor component considered to be in an unhealthy state back to a healthy condition by either repair or replacement of that conveyor component.

Also shown in FIG. 1 are various communication hubs or routers 31 and 32, which, in some embodiments of the invention, may be conveniently strategically located along the length of the conveyor belt system 1. This has advantages in some instances to minimise power transmission requirements, as lower power transmissions only would then be required to transmit the sensor data, etc. from the sensors to the processor in the server 30.

Transmission of the sensor data, etc. may be performed by any one or combination of wireless transceivers 31 (e.g. using Wi-Fi, Bluetooth or any other wireless transmission media), or, via hard-wired transceivers 32 (e.g. using cable, optical fibre or any other physical transmission medium), to the server 30.

The overall system/method for monitoring therefore includes at least one sensor in each roller, liner or other conveyor component to be monitored, a central server 30, and a user interface 40. Each sensor is adapted to sense at least one characteristic of a respective conveyor component and produce sensor data representative of said sensed characteristic.

The central server 30 is adapted to receive said sensor data from each sensor, process said sensed data to generate status data in relation to each conveyor component. The user interface 40 is adapted to receive said status data from said central server and provide maintenance information to a user indicative of any maintenance required to be performed on said conveyor component.

Monitoring/Sensing Components

Figure 2:
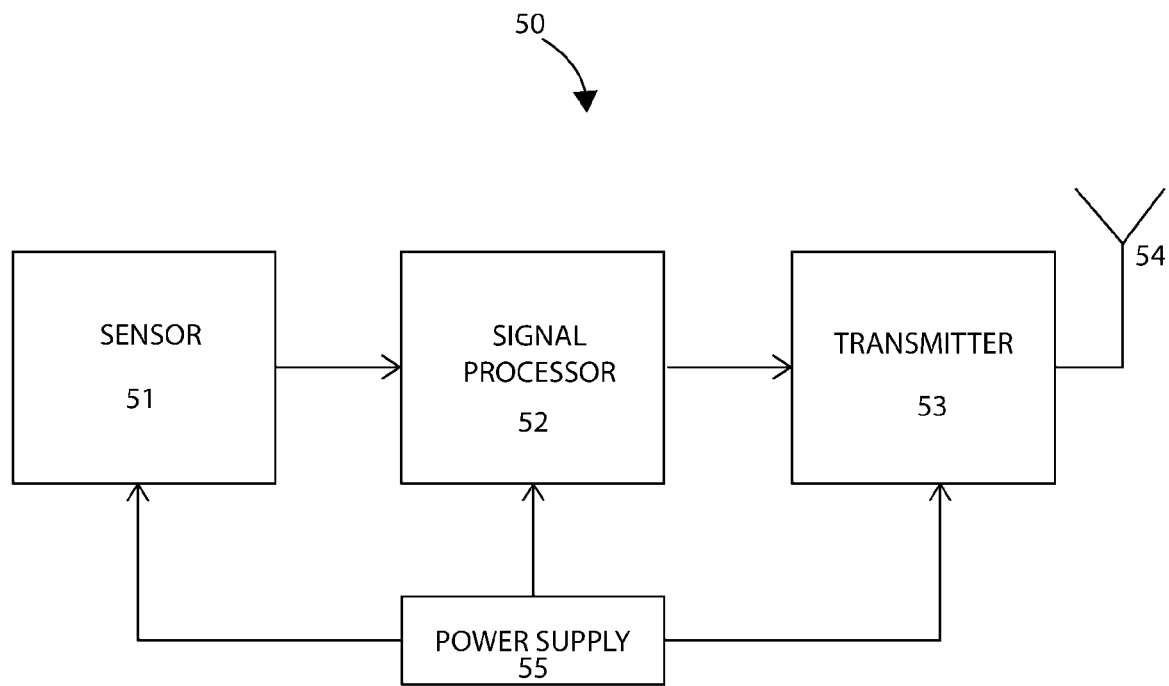
FIG. 2 illustrates a block diagram of the main parts of a monitoring/sensing device of a conveyor component in accordance with the present invention.
Figure 3A:
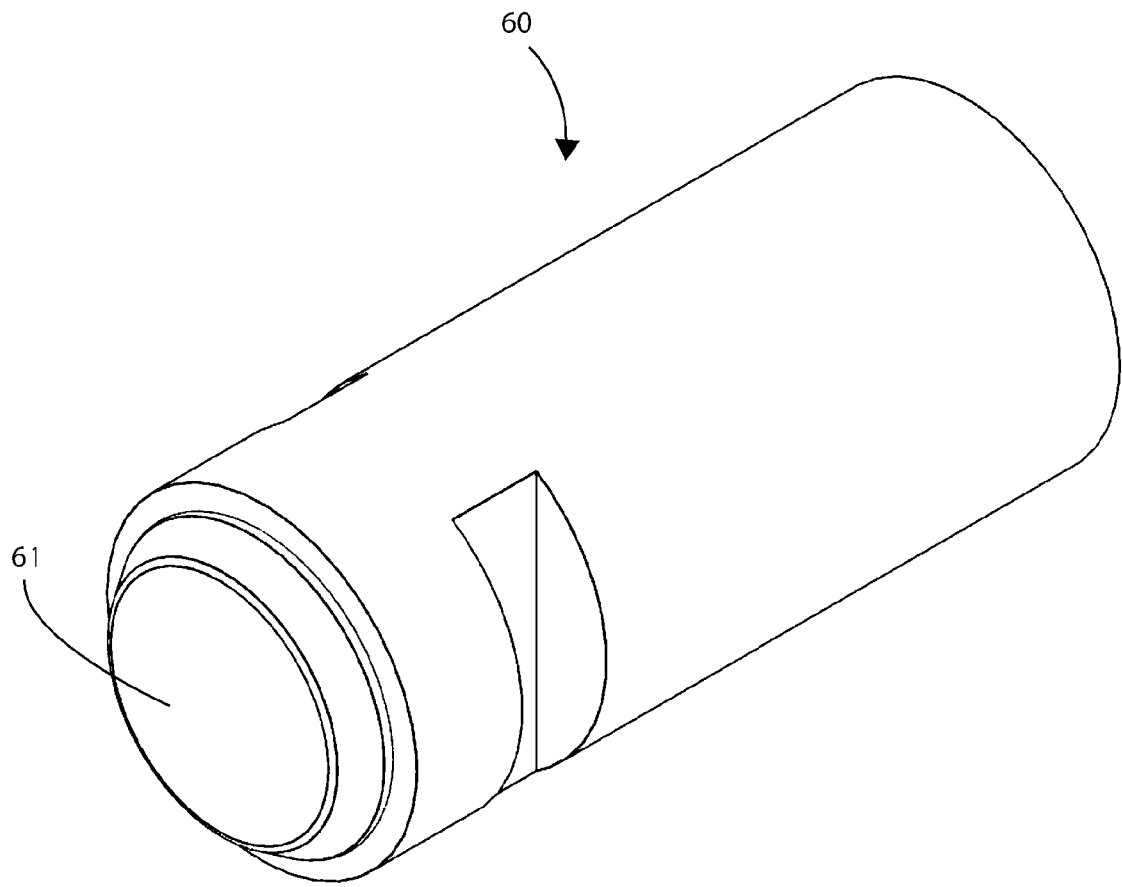
FIG. 3 illustrates various views of the main monitoring/sensing device components which may be installed in one end of conveyor roller, in accordance with an exemplary embodiment of the present invention.
Figure 3B:
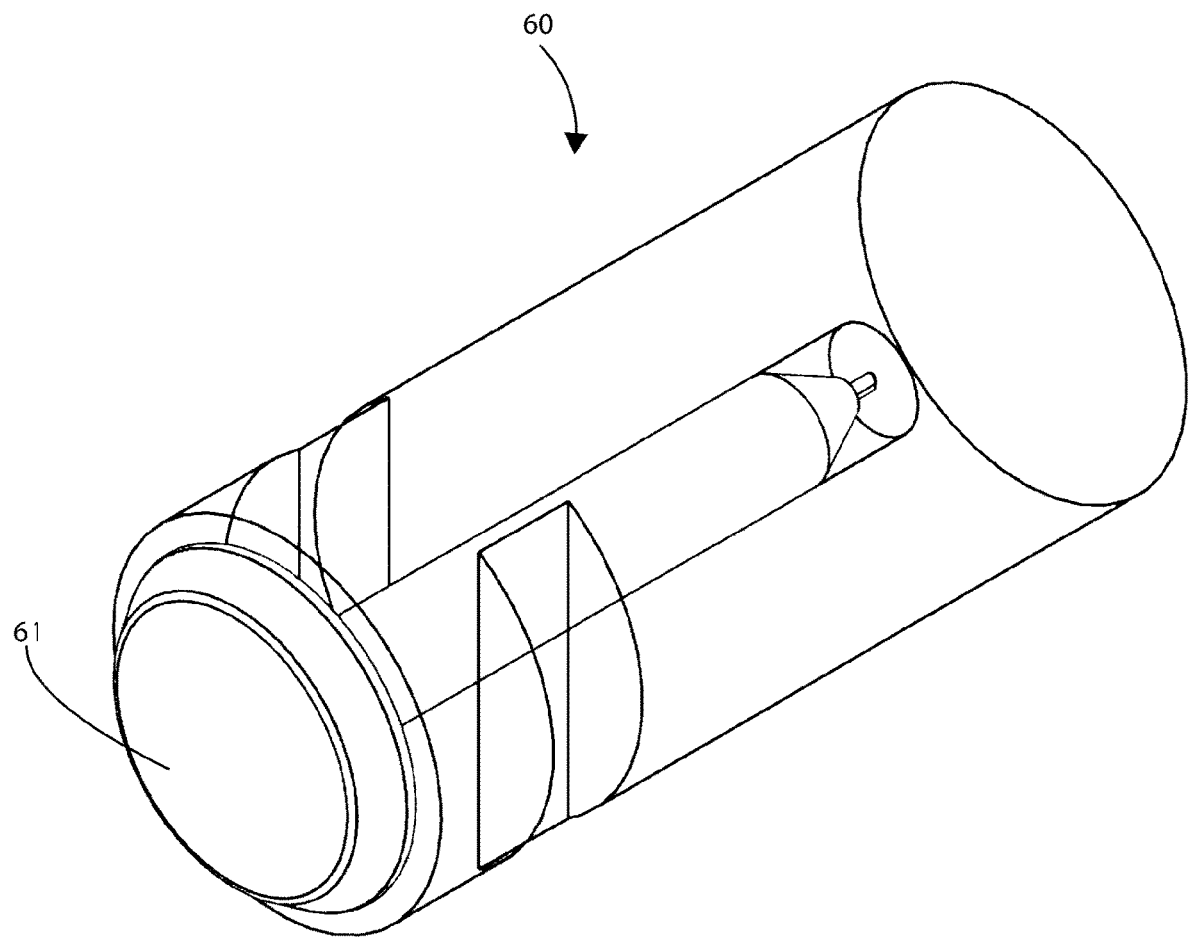
Figure 3C:
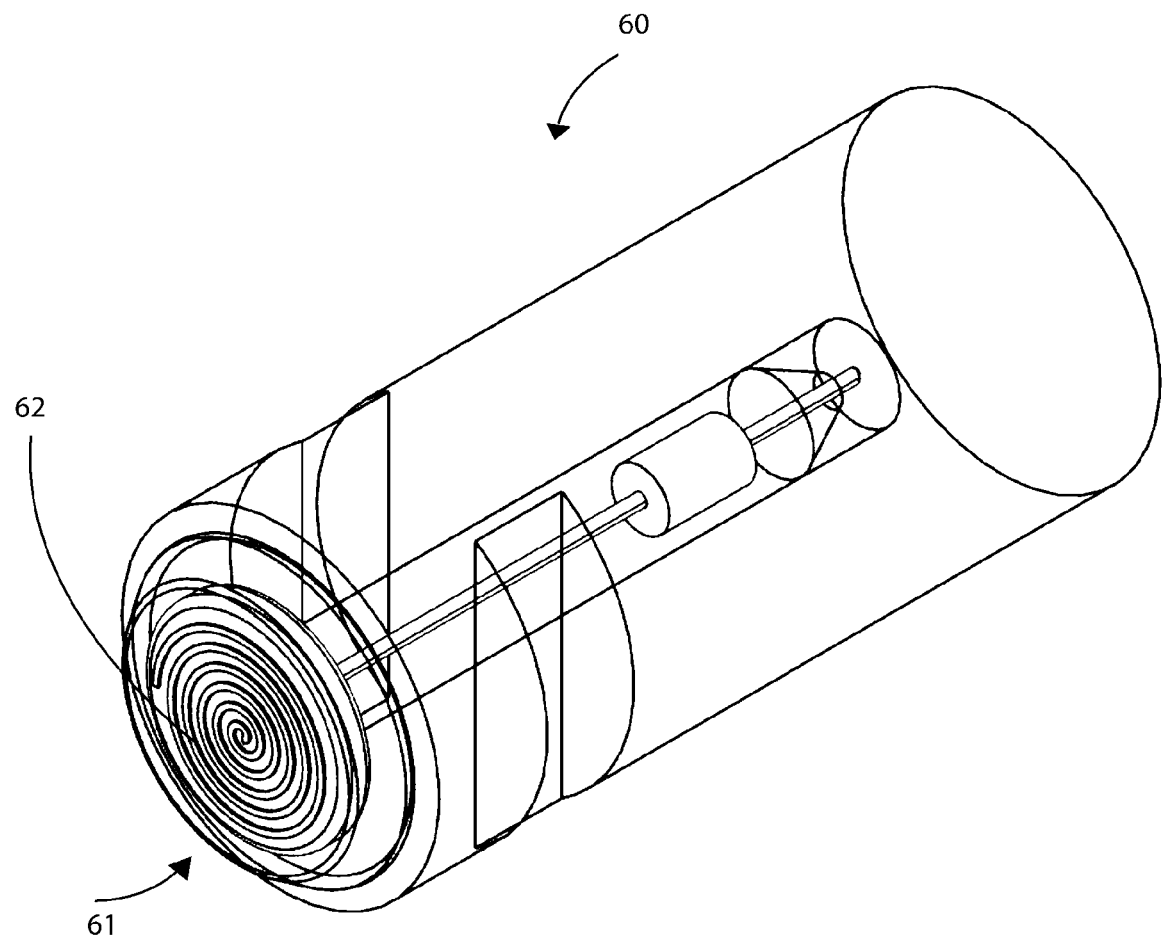
Figure 3D:
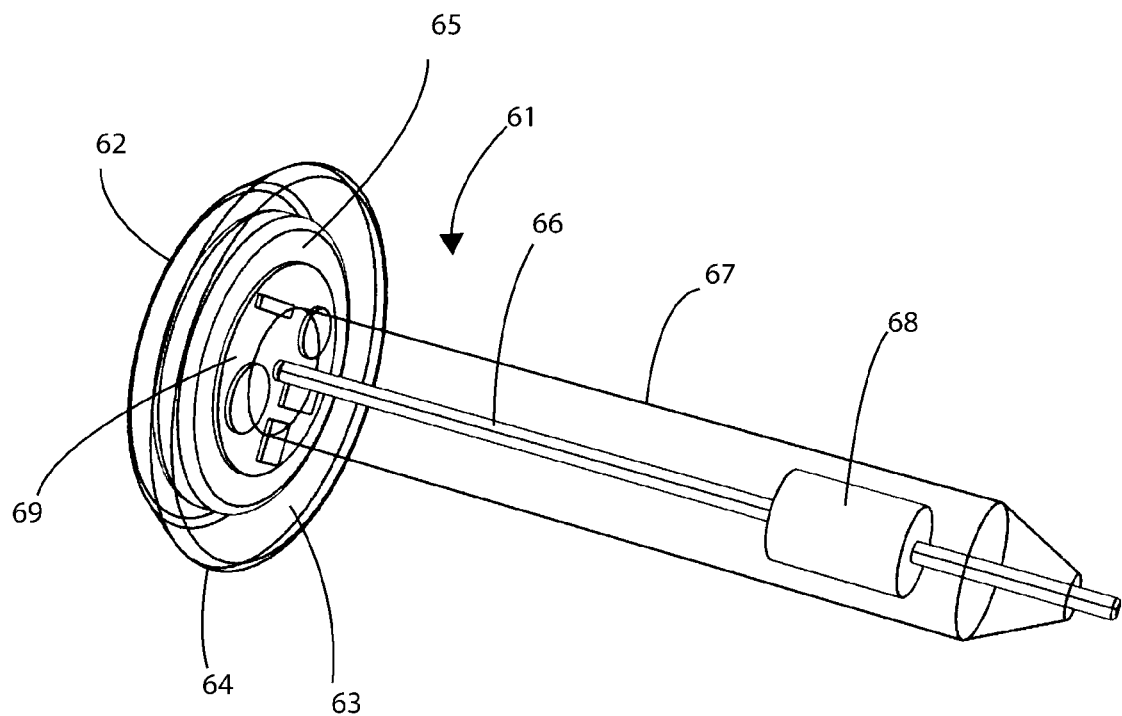

In FIG. 2 is shown a block diagram to exemplify the main monitoring/sensing component parts which may be typically incorporated into a conveyor component, in accordance with the present invention.

In essence, the roller or liner or other conveyor component of the present invention incorporates monitoring/sensing componentry 50, which may include a sensor 51, a processor 52, a transmitter 53 including an antenna 54, and, a power source 55.

The monitoring componentry 50 shown in FIG. 2 is preferably integrally formed within or substantially embedded into the conveyor component. Example of particular embodiments will be hereinafter described.

The sensor 51 is adapted to sense at least one characteristic of said conveyor component to produce sensor data representative of said sensed characteristic. Typical characteristics of the conveyor which may be sensed include temperature, noise and vibration.

An identifier is adapted to provide unique identification data for the respective conveyor component. The identifier may be embodied in the form of an RFID tag, a QR code or any other identifier which may be read and transmitted in some manner to the server for processing.

The transmitter 53 is adapted to transmit the sensor and identification data to a central server 30 wherein said data is processed to generate status data in relation to the conveyor component indicative of any maintenance required to be performed on said conveyor component. The transmitter 53 may include an antenna 54, examples of which will be described hereinafter.

A power source 55 may be associated with each conveyor component to power the requisite circuitry, and this may be embodied in a variety of forms depending on the particular conveyor component. For example, the circuitry could be powered by a battery, a generator to generate power during rotation of a roller, from the vibration of the component(s) such as a vibration capacitor, from the heat of the component(s), etc. Alternatively, passive circuity may be provided in which powers the circuity upon reception of a signal transmitted thereto.

Rollers with Shaft End Mounted Sensor

In FIG. 3 is shown various views of these monitoring/sensing components 50 installed in one end of conveyor roller 60, in accordance with an exemplary embodiment of the present invention, the end of the roller 60 including a monitoring/sensing housing 61.

In particular, FIG. 3(*a*) shows an external appearance of the end of the roller, whilst FIG. 3(*b*) shows a similar view but with the shaft in ghosting, i.e. transparent, so as to see the location of the monitoring/sensing device housing 61 within the conveyor shaft. FIG. 3(*c*) shows the same view, but with both the conveyor shaft 60 and the monitoring/sensing housing 61 in ghosting so that the internal monitoring/sensing component parts, including the antenna 62 can be seen, whilst FIG. 3(*d*) shows a view from the opposite direction to the view of FIG. 3(*c*), so as to illustrate some of other monitoring/sensing components which may be included in the device 60, such as a temperature sensor 63, a noise sensor 64, a vibration sensor 65, and, an accelerometer 68 provided on the shaft 66.

An identification device 69 may also be incorporated, so as to uniquely identify a particular conveyor roller 60 into which the device 61 is installed.

As best seen in FIGS. 3(*b*), 3(*c*) and 3(*d*), the housing 61 of the monitoring/sensing device may be embodied to have the appearance of a pin or nail, incorporating a shaft portion 67 and a head portion 68. The housing 61 may be formed of a hard plastics or other insulative material such that it does not interfere with or effect the operation of the electronic circuitry and sensor components within the housing 61.

By manufacturing the monitoring/sensing device 61 in this form, the device 61 may be readily inserted axially into the end of a conveyor roller 60. As will be appreciated, the cost of producing this pin like configuration in this manner is relatively inexpensive.

Figure 4A:
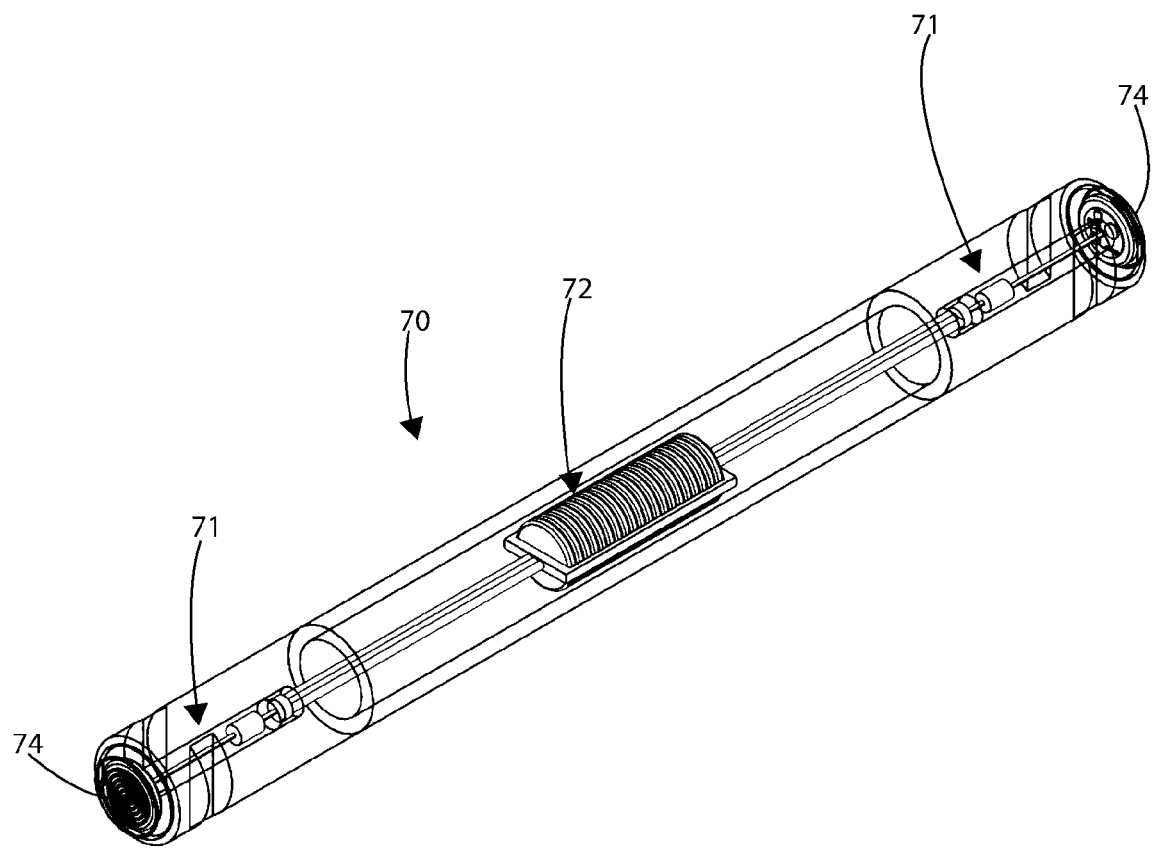
FIG. 4 illustrates various views of the main monitoring/sensing device components of a hollow shaft conveyor roller, in accordance with another exemplary embodiment of the present invention.
Figure 4B:
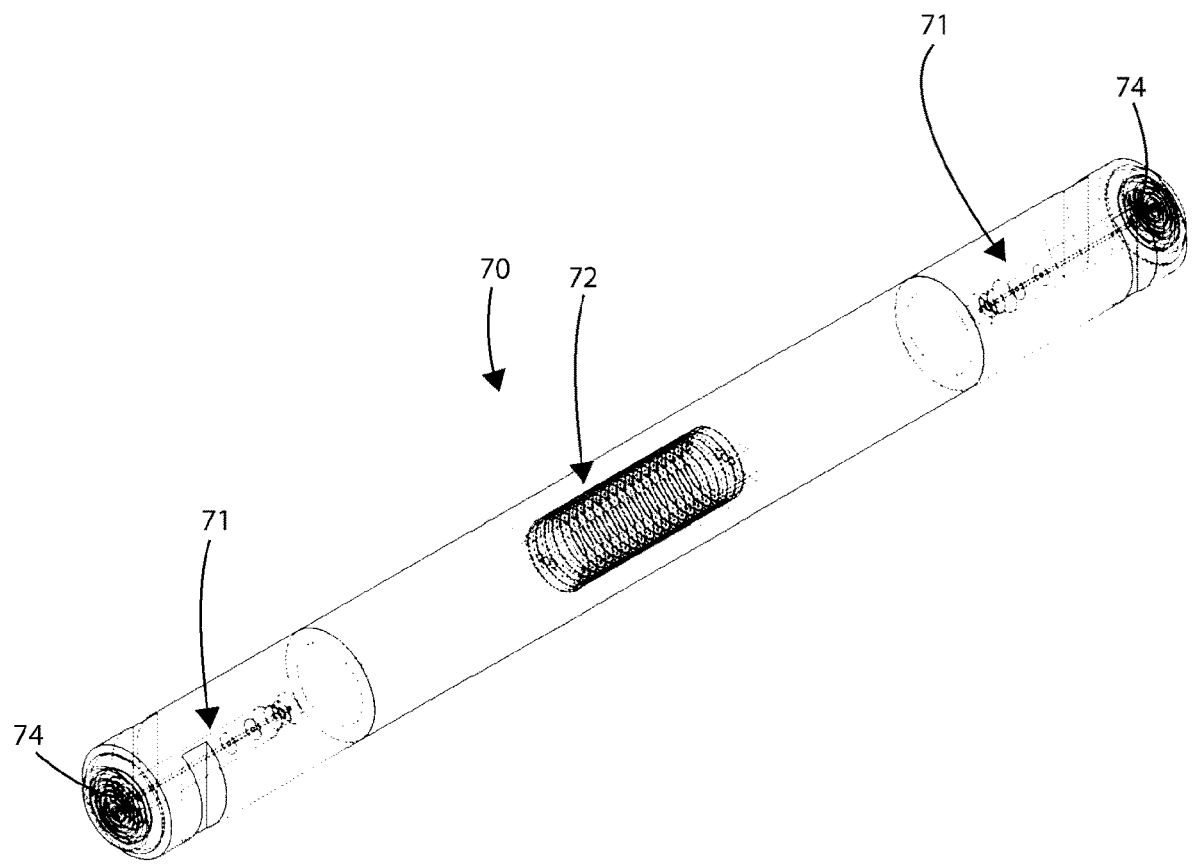

In FIG. 4 is shown various views of the main components of a conveyor roller, in accordance with another exemplary embodiment of the present invention. This embodiment shows a hollow shaft conveyor roller 70, having a monitoring/sensing device 71 on either end of the roller shaft 70.

In particular, FIG. 4(a) shows the roller shaft 70 in ghosted form, with hard wire connection running through the shaft between devices 71 and with other components, such as batteries housed within the hollow shaft itself.

A wiring loom 72 may be provided in the hollow shaft to facilitate continuous power transfer from the internal battery pack to the devices 71, enabling the device 70 to operate on a continuous basis and not only when the device recognises a state change. The loom 72 also carries a connection between the antennas 74 of each device 71, for the purposes of redundancy. This improves overall robustness, as it will more reliably communicate its observations, and prioritise the transfer of that data via the antenna 74 that draws the least power.

Garland Type Rollers with Radial Mounted Sensor

In FIG. 5 is shown various views of the main components associated with a garland or catenary roller, in accordance with yet another exemplary embodiment of the present invention.

Figure 5A:
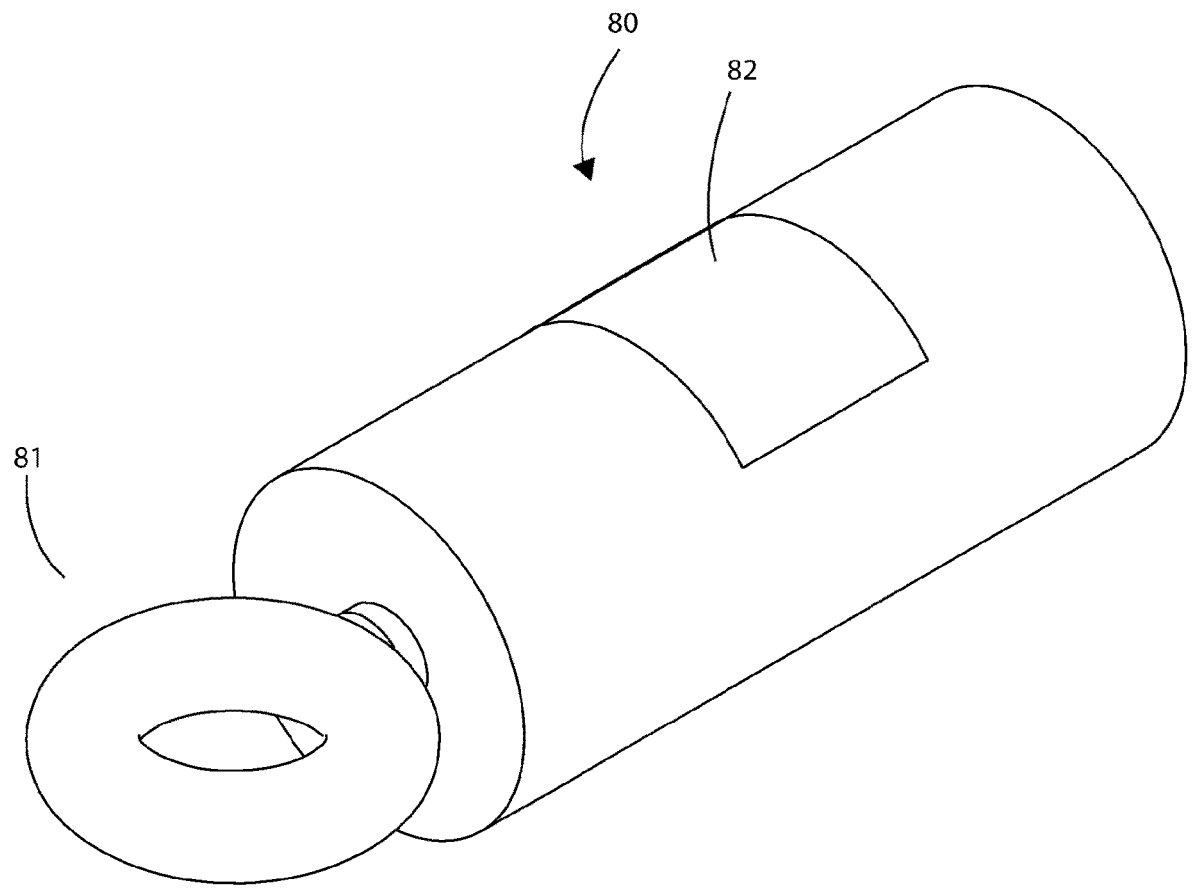
FIG. 5 illustrates various views of the main monitoring/sensing components associated with a garland roller, in accordance with yet another exemplary embodiment of the present invention.
Figure 5B:
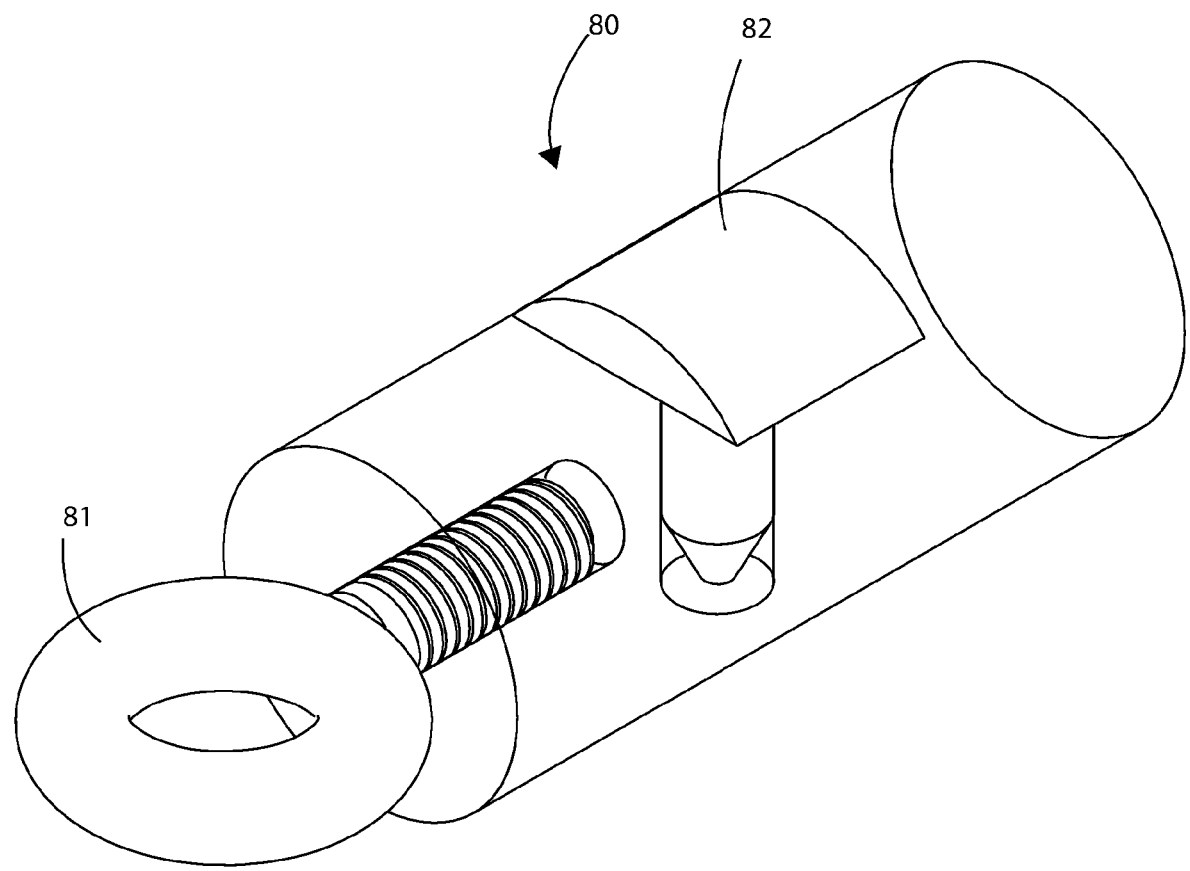

In these types of garland rollers 80 the end of the shaft is drilled and tapped, and an eye bolt 81 or similar installed in. By linking rollers 80 together with these ends and fixing the outer ends to the conveyor stringers there is no need for an idler frame, as the shafts of the rollers themselves form the support needed. As a result of their configuration, it is therefore not possible to insert the monitoring/sensing device 82 of the present invention axially into the end of the shaft. Therefore, in this embodiment of the invention, the monitoring/sensing device 82 is inserted to sit radially on the shaft, outside of the shell and on a flat portion 83 which may be machined into the shaft In particular, FIG. 5(a) shows a garland roller 80 with its eye bolt 81, incorporating the monitoring/sensing device 82 of the present invention therein, whilst FIG. 5(b) shows the garland roller 80 in ghost form, so that the overall shape of the monitoring/sensing device 82 can be readily seen.

Figure 5C:
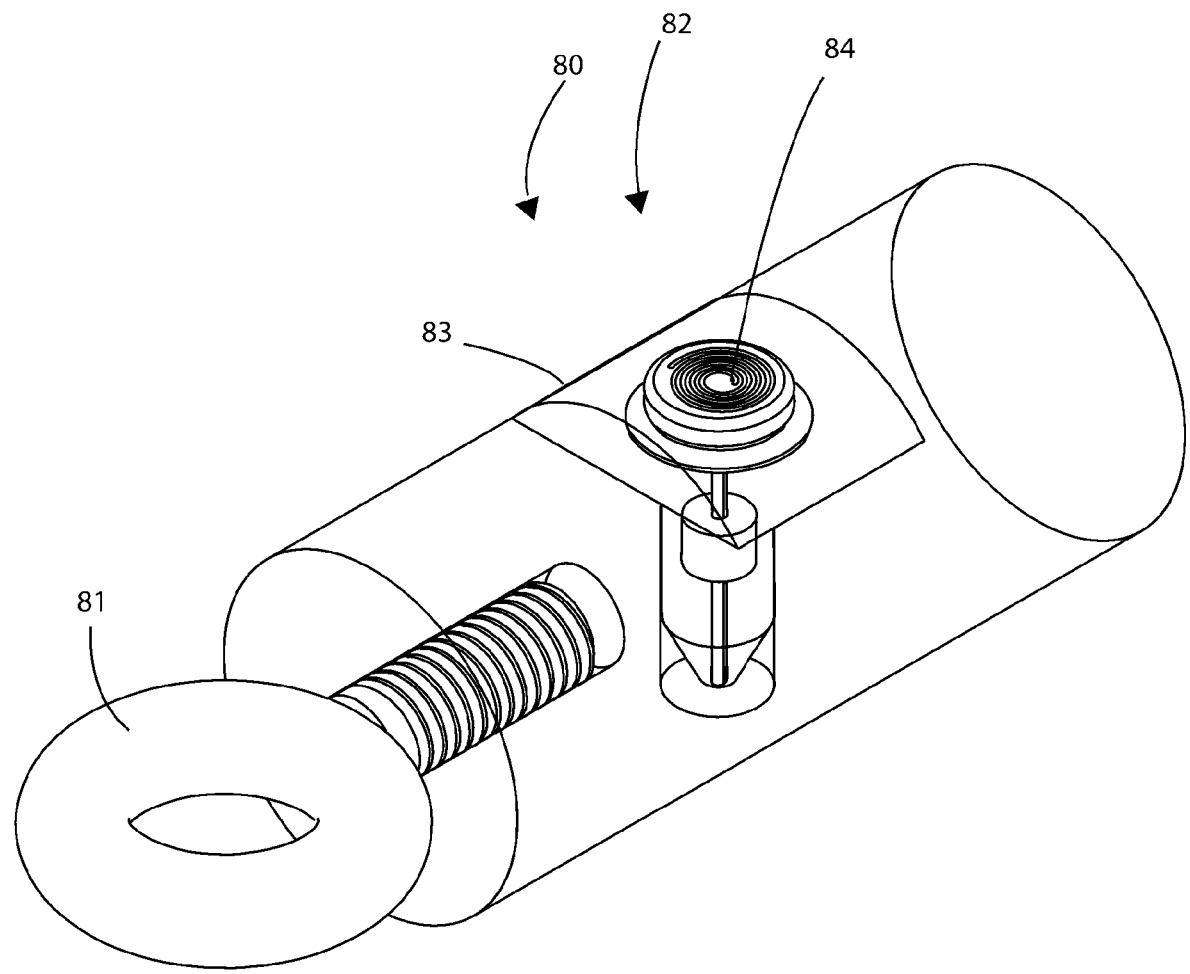
Figure 5D:
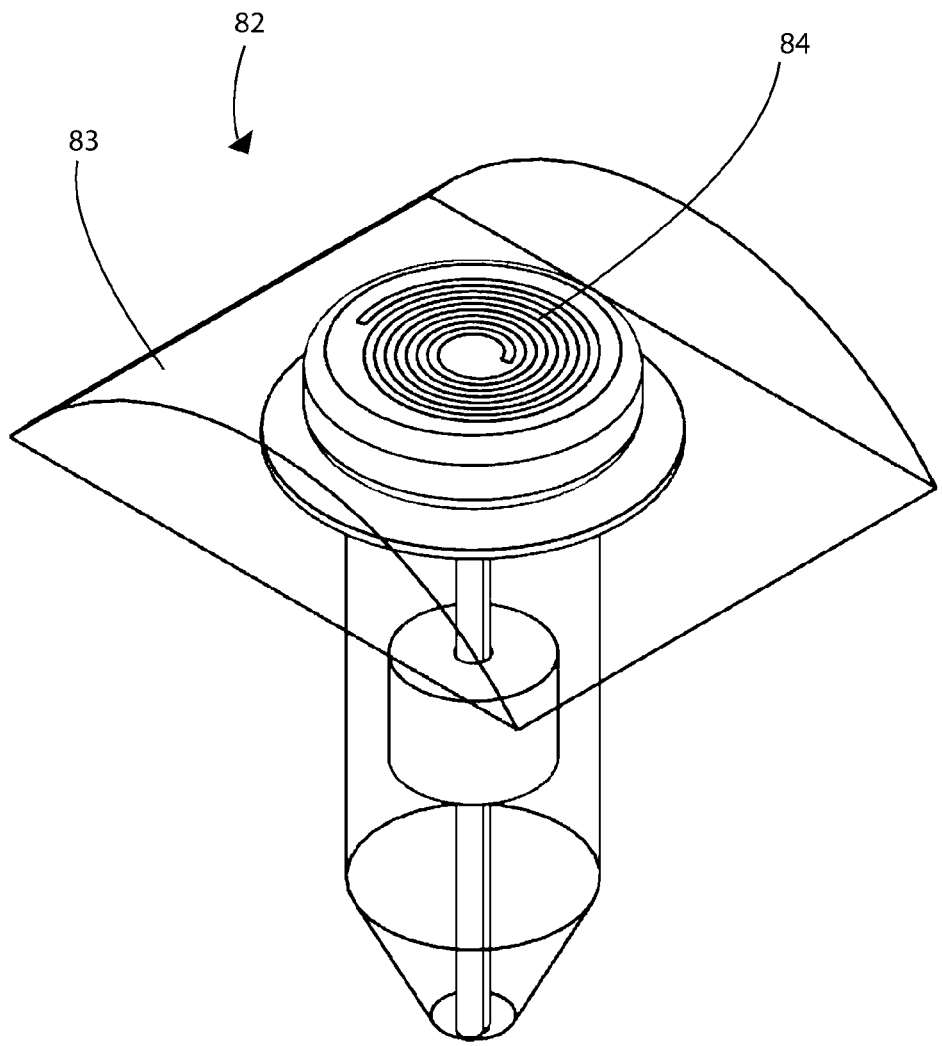

FIG. 5(c) shows the roller 80 and also the monitoring/sensing device 82 in ghost form, showing how the device 82 may be radially installed on the shaft of the roller 80, whilst FIG. 5(d) shows the monitoring/sensing device 82 alone in ghost form so that the internal monitoring/sensing components can be seen, An antenna 84 may be installed on the flat portion 83 of the shaft of the roller 80, and be moulded into the head portion of the nail or pin like housing, and then the other circuitry components may then depend therefrom on the shaft of the pin or nail like housing, as per the previously described embodiments.

Alternative Positioning of Sensors

Whilst FIG. 3 shows a pulley/roller 60 with a sensor 50 installed in one end thereof, it will be appreciated that the sensor 50 may be located in a variety of positions within or associated with a pulley/roller 60.

Figure 6:
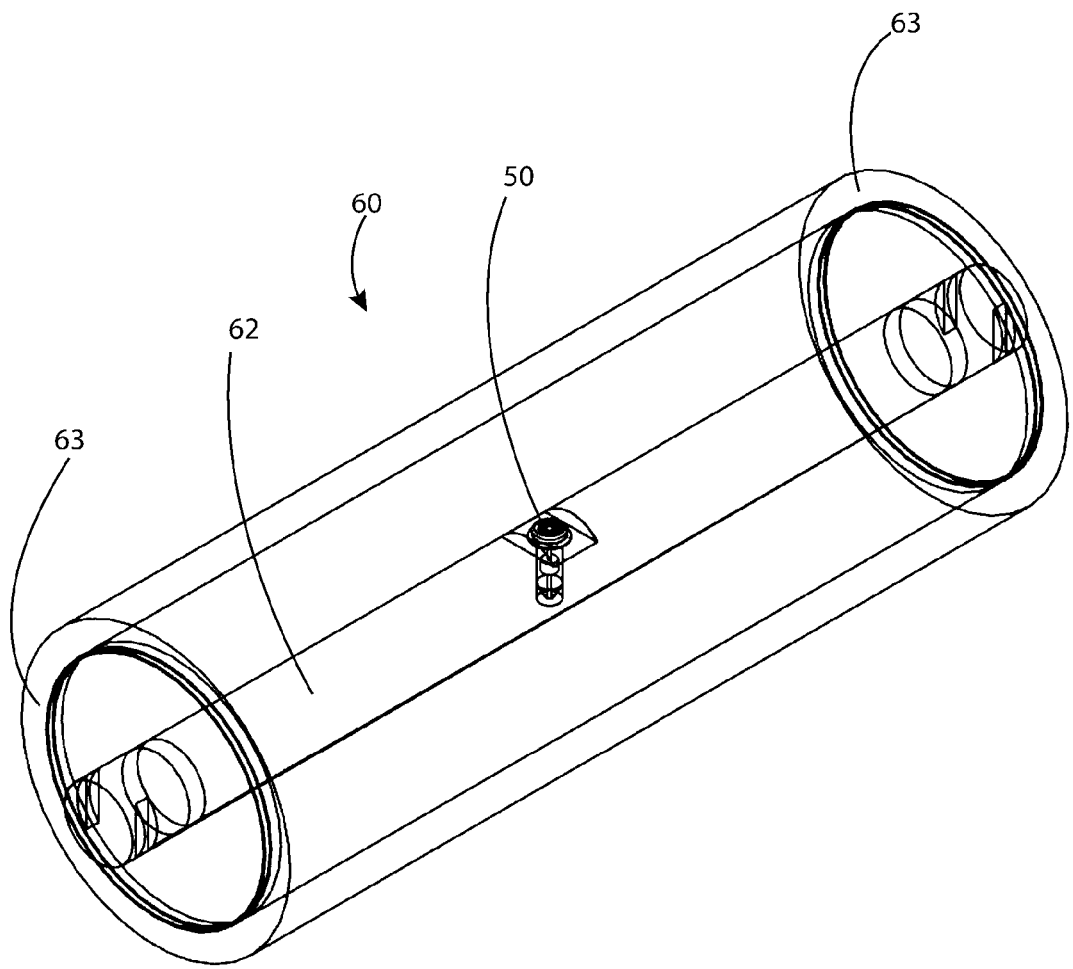
FIG. 6 illustrates an alternative example embodiment of a roller, showing an alternative positioning of the sensor/antenna.

For example, in FIG. 6 is shown a monitors/sensing component 50 installed within the body of a roller 60, and specifically in this example embodiment, installed in a central location on the shaft 62, substantially intermediate the ends 63 of the shaft 62 of the roller 60.

This embodiment of FIG. 6 is particularly appropriate when the roller 60 is formed of a non-metallic material, such as from a plastics or other non-metallic composite material, whereby signal propagation to/from an antenna associated with the sensor 50 is thereby permissible.

It will be understood that the sensor 50 may be installed/positioned at any other location within the roller 60 or other conveyor component. The roller/component 60 is ideally constructed of a material which will not impair the transmission of radio waves, thus allowing the antenna/sensor to be wholly or partly contained within the roller, whilst still affording acceptable signal strength for the device to function as intended.

Liners Incorporating Sensors

Figure 7A:
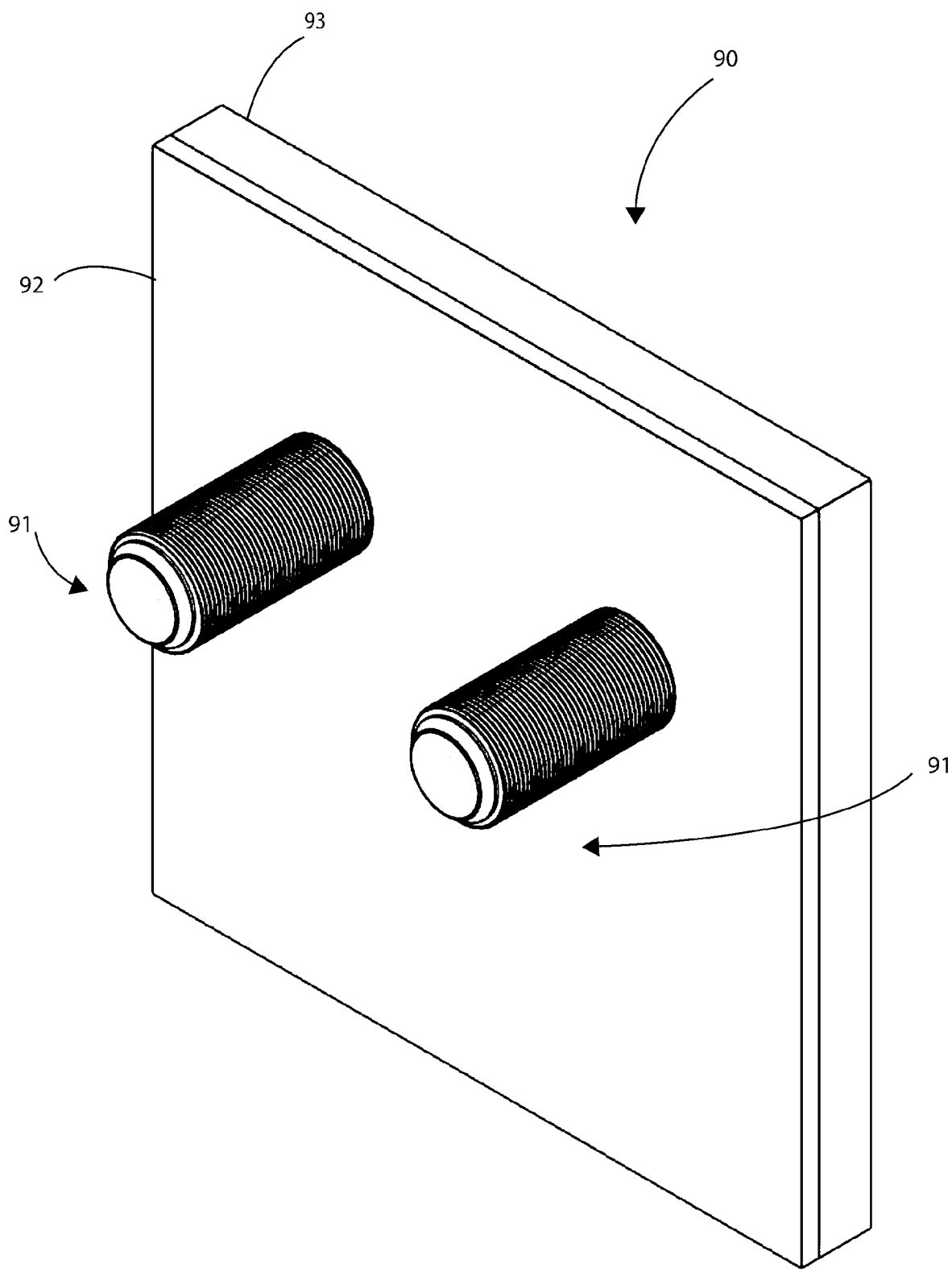
FIG. 7 illustrates various views of the installation of monitoring/sensing components associated with a liner, in accordance with another exemplary embodiment of the present invention.
Figure 7B:
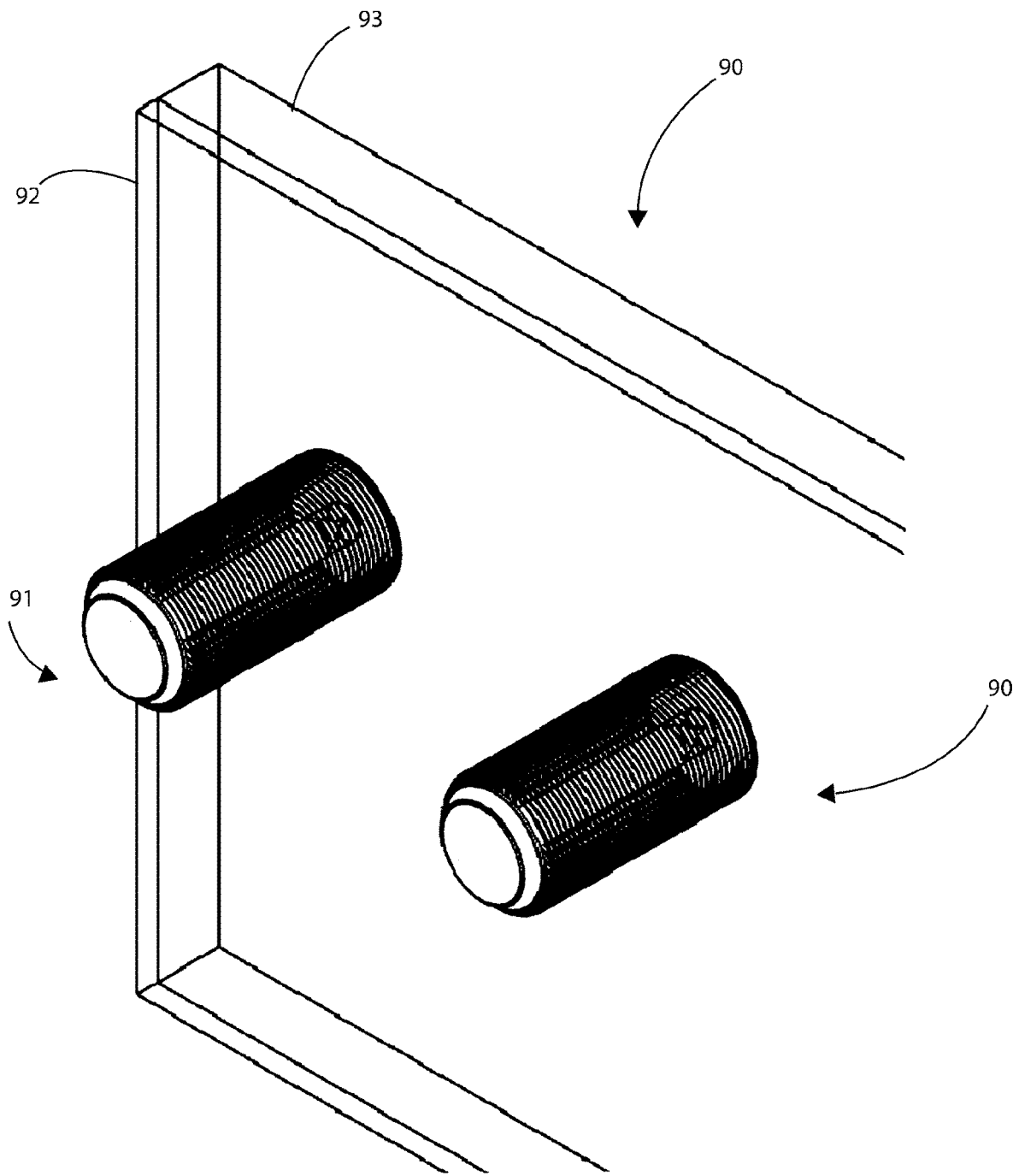

In FIG. 7 is shown various views of the installation of the monitoring/sensor device in accordance with another preferred embodiment of the present invention installed in a liner component of a conveyor system.

The liner devices of the present invention may be installed in a variety of conveyor components, including, but not limited to crusher liners, transfer chute liners, earthmoving bucket liners and ground engaging tools (GET), and truck bed liners.

In FIG. 7(a) is shown a chute 90 incorporating the chute housing 92 with a liner 93 on the wearing face side thereof, and including a pair of monitoring/sensor devices 91 installed thereon.

The monitoring/sensing devices 91 may sense heat conduction. By virtue of the way that a liner works, the outer wearing face 93 typically has more insulative properties than the inner parent metal 92 on which the studs that support the liner are fixed. Therefore, once the wearing face 93 has eroded and the bulk material being transferred comes into contact with the parent metal 92, the heat in that metal 92 and the studs increases dramatically. By recognising that state or temperature change it can be indirectly conclude that the liner 93 is worn and is no longer fit for purpose.

In FIG. 8 is shown various views of the installation of sensors in a short-stud or small diameter liner, in accordance with yet another exemplary embodiment of the present invention.

Figure 8A:
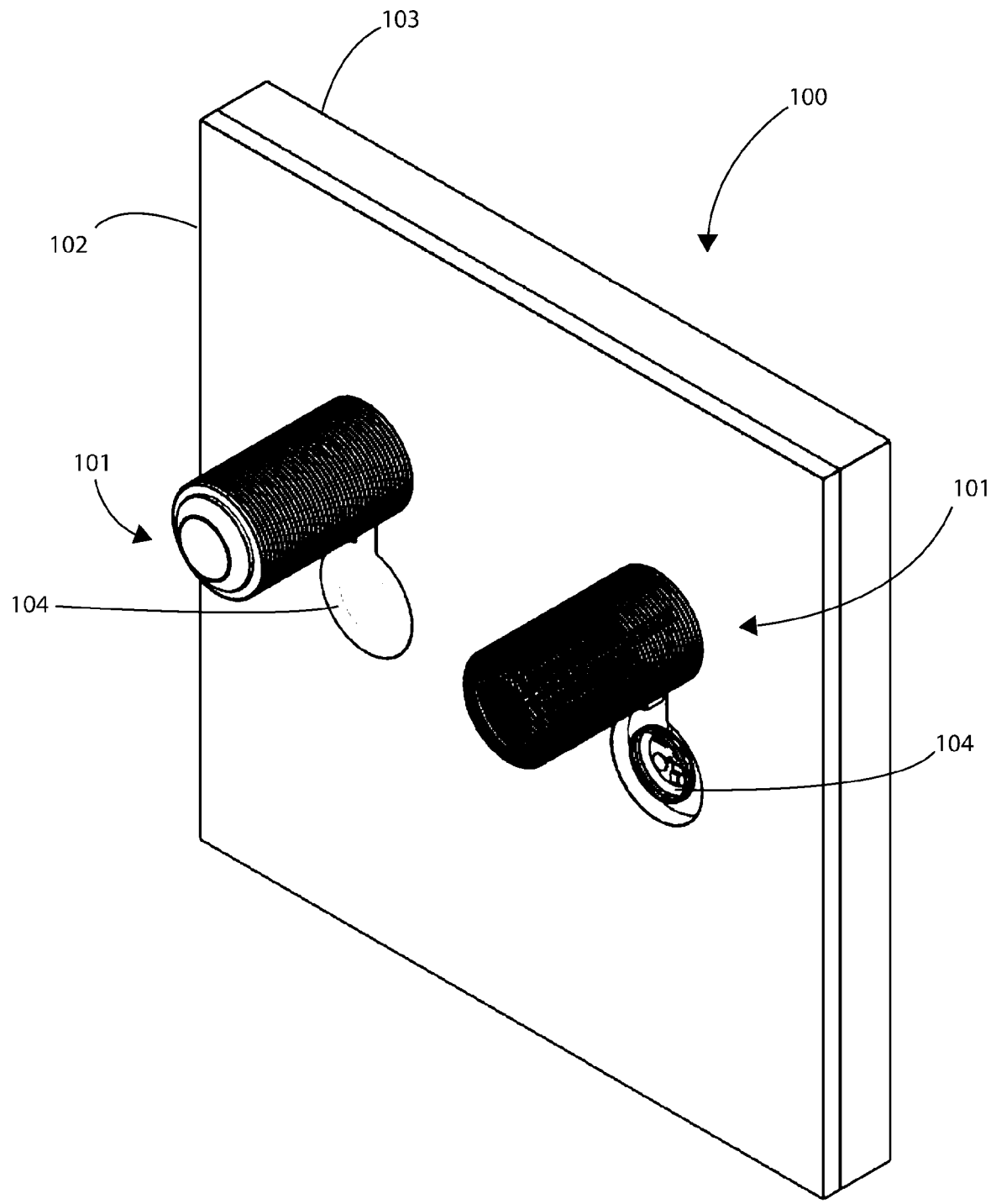
FIG. 8 illustrates various views of the installation of monitoring/sensing components associated with a short-stud or small diameter liner, in accordance with yet another exemplary embodiment of the present invention; and, FIG. 9 illustrates a block diagram showing the main implementation steps which may be typically performed in the conveyor monitoring method/system of the present invention.
Figure 8B:
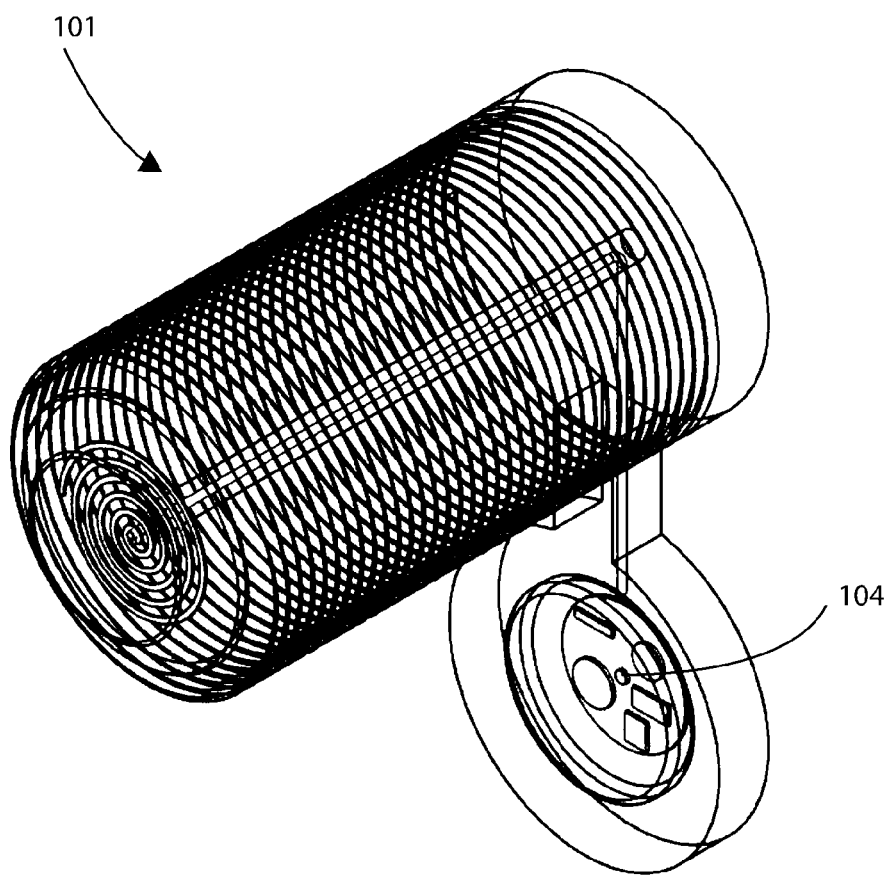

In particular, in FIG. 8(a) is shown the monitoring/sensing device 101 installed on a conveyor component liner 100, whilst FIG. 8(b) shows the monitoring/sensing device 101 alone.

As seen the device 101 is at least partly embedded in a liner 102. This is a solution for when a liner stud is too short or has too small a diameter to accommodate the monitoring/sensing device of the previously described embodiment. In particular, in this embodiment, the liner of the stud is drilled through to the parent metal so that an antenna lead can be chased through it. A recess is milled into the back of the liner as well. Into this recess is placed the battery, circuit board and sensors. All of these components may be similar to the previously described embodiment. The circuit board is connected to the antenna at the end of the respective liner stud via the antenna lead. The antenna and the device are both contained within a thermally resistant, hard plastic, as previously described.

Sensor Design

These various component parts may be embodied in a form which may be readily installed in a variety of different conveyor components.

As described the monitoring/sensor components may preferably be assembled into a shape that resembles a nail or plug, subject to the shape of the component restricting this. This is advantageous to achieve cost effective mass production, and easy to install, resulting in a highly capable device.

Exemplary Implementation of Sensing System

Figure 9:
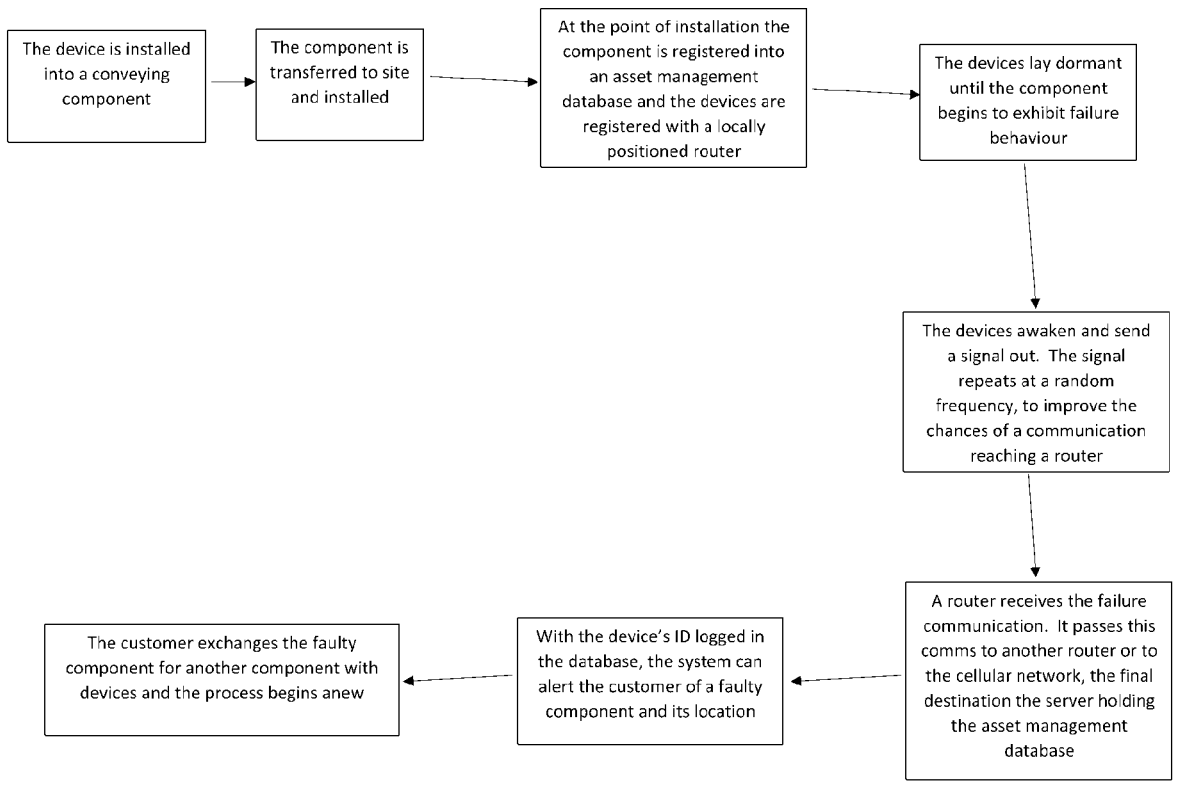

In FIG. 9 is shown a block of typical implementation steps which may be performed in the conveyor monitoring method/system of the present invention.

At the point of manufacture, all of the inputs that go into a conveyor component may be recorded, such as the date of manufacture, the source of materials or the technicians involved. All of this QA/QC information may be assigned to the component's unique ID in the system database.

When a sale of a conveyor component is made, the sale information, such as the customer details may also be collected in the database, along with shipping information, such as the freight provider or tracking number.

Once the component is delivered to site it is installed. In instances where a customer has not set up a network the component acts no differently to any other component.

Once the customer asks for their installed components to be enabled, the network may be set up according to customer requirements.

The network may be an array of battery powered IoT routers, communicating between one another as required, with one or more routers connected to the cellular network for passing the conveyor component data off site. The routers may typically also notify of the remaining battery life, so as to keep them operational and the network complete.

During installation, the location of each unique component is logged in an asset management database and pairs the component with a router.

The asset management database is made available to the customer so that they can maintain it into the future as they install and replace more conveyor components.

Alternatively, a customer may elect to purchase devices that operate on an internet protocol that can pass data directly to local cellular network service providers without the assistance of a router network. In such circumstances, the device may still have its physical location logged in the asset management database, but it will operate as intended without any supporting network infrastructure.

In one form of implementation of the system, for a customer seeking a higher service level implementation, the component may lay dormant until it registers a failure (e.g. damaged bearing, worn liner body or drop in battery voltage) or it has hit a replacement milestone (e.g. a pre-determined life stage or time in service).

At this point, the system animates, communicating with the closest network router to inform the server of the failure mode. Depending on the failure mode, it continues to provide data under pre-determined conditions (e.g. at a set frequency or whenever the failure trigger thresholds are met again).

The server may create two notifications, one each for the customer's maintenance/operational representative informing them of the nature of failure and the criticality of response (typically via a purpose designed web dashboard), the other for the customer's procurement representative, in effect placing a component replacement order.

If the mode of failure is suggestive of a manufacturing quality issue or it requires further investigation, the notification to the procurement representative will include a return to supplier trigger, allowing the supplier to take back the component and strip it down to determine the failure source.

Contingent on customer authorisation, the server issues actionable data to the customer's operations control system, with which it can alter operating parameters to minimise the impact of the failure prior to response from maintenance personnel.

In an alternative service level, the conveyor component may lay dormant until it registers a failure (e.g. damaged bearing, worn liner body or drop in battery voltage) or it has hit a replacement milestone (e.g. a pre-determined life stage or time in service).

At this point the system animates, communicating with the closest network router to inform the server of a failure. There is no suggestion of the nature of the failure. The device simply goes from a healthy to unhealthy state. This binary state change is very undemanding on data, so passing it out via the cellular network is very cheap. The data from the unhealthy device is sent to the server and screened for validity. If it is determined to be a false negative it is ignored, if not it may be passed to a customer representative.

The customer representative can be anyone. Typically, the customer may receive a text message on their phone, detailing the location of the unhealthy device, such that they can choose to take appropriate remedial action.

As will be appreciated from the foregoing description, the present invention therefore provides a monitoring/sensor device which has a number of distinct advantages over prior art devices. This includes the device being cheap, simple and easy to install, to the extent that it becomes ubiquitous, and a nondescript addition to every roller or other conveyor component that is produced.

The device of the present invention also typically has a long life by operating by exception, producing signals only when there is something to report. That is the device of the present invention prioritises data of meaning over data-for-data's sake.

The device of the present invention may be implemented to pair with a discrete (but flexible) IoT network, to achieve an effortless and self-sufficient installation. The device may also optionally include machine learning capability.

The device preferably operates by exception, triggering once pre-set conditions have been met (i.e. high bearing/shaft temperatures or excessive vibration).

The communications network used in the monitoring/sensing system may be a battery operated wireless field network, internet connected via cellular network enabled master router. The system may use open source IoT protocol for device-to-field network connection, potentially facilitating IoT access for competitor products.

Whilst the present invention has been herein described with reference to some specifically described embodiments and as illustrated in the accompanying drawings, numerous variations and modifications will become apparent to persons skilled in the art. All such variations and modifications should be considered to fall within the spirit and scope of the present invention as hereinbefore described and as hereinafter claimed

The invention claimed is:

1. A conveyor component monitoring system for monitoring at least one characteristic of at least one conveyor roller, the system including:
   at least one sensor, processor and transmitter associated with each said conveyor roller, each sensor being provided substantially within a shaft of the respective conveyor roller, each sensor adapted to sense at least one characteristic of a respective conveyor roller and produce sensor data representative of said sensed characteristic,
   each processor configured to determine when a predetermined abnormal characteristic is sensed, and, each transmitter configured to only transmit said sensor data when said abnormal characteristic is sensed;

a central server, adapted to receive said transmitted sensor data, process said sensed data to generate status data in relation to each conveyor roller; and, a user interface, adapted to receive said status data from said central server and provide maintenance information to a user indicative of any maintenance required to be performed on said conveyor roller.

2. The conveyor component monitoring system as claimed in claim 1, wherein each said sensor is adapted to sense any one or combination of:

temperature; noise; and vibration.

3. The conveyor component monitoring system as claimed in claim 1, wherein said conveyor roller includes a conveyor roller identifier adapted to provide unique identification data for the respective conveyor roller.

4. The conveyor component monitoring system as claimed in claim 1, wherein said transmitter is adapted to transmit said sensor data and/or said identification data via a communications channel, wherein said communications channel includes a wired (e.g. optical fibre) and/or wireless (e.g. Wi-Fi, Bluetooth) communications channel.

5. The conveyor component monitoring system as claimed in claim 1, wherein said conveyor roller includes a power source, including any one or combination of:

a battery; and, an energy harvesting device to self-generate power.

6. The conveyor component monitoring system as claimed in claim 1, wherein said transmitter includes an antenna which is positioned at or on extremity of said conveyor roller so as to at least partially protrude from said conveyor roller.

7. The conveyor component monitoring system as claimed in claim 1, wherein each said sensor is embedded within and/or integrally formed substantially within the shaft of the conveyor roller.

8. A conveyor component monitoring/sensing device adapted to be provided substantially within a shaft of a conveyor roller, the device including:

at least one sensor adapted to sense at least one characteristic of said conveyor roller to produce sensor data representative of said sensed characteristic;

a processor configured to determine when a predetermined abnormal characteristic is sensed;

a conveyor roller identification device adapted to provide unique identification data for the respective conveyor roller; and, a transmitter adapted to transmit said sensor and identification data to a central server wherein said data is processed to generate status data in relation to the conveyor roller indicative of any maintenance required to be performed on said conveyor roller, wherein said transmitter is configured to only transmit said sensor data when said abnormal characteristic is sensed.

9. The conveyor component monitoring/sensing device as claimed in claim 8, wherein each sensor is embedded within or integrally formed substantially within the shaft of the conveyor roller.

10. The conveyor component monitoring/sensing device as claimed in claim 8, wherein said sensor is adapted to sense any one or combination of:

temperature; noise; and vibration.

11. The conveyor component monitoring/sensing device as claimed in claim 8, wherein said sensor is adapted to produce sensor data representative of said sensed characteristic.

12. The conveyor component monitoring/sensing device as claimed in claim 8, wherein said transmitter is adapted to transmit said sensor data and/or said identification data via a communications channel, wherein said communications channel includes a wired (e.g. optical fibre) and/or wireless (e.g. Wi-Fi, Bluetooth) communications channel.

13. The conveyor component monitoring/sensing device as claimed in claim 8, including a power source, including any one or combination of:

a battery; and, an energy harvesting device to self-generate power.

14. The conveyor component monitoring/sensing device as claimed in claim 8, wherein said transmitter includes an antenna which is positioned at or on extremity of said conveyor roller so as to at least partially protrude from said conveyor roller.

15. The conveyor component monitoring/sensing device as claimed in claim 8, wherein said device includes a housing, which is substantially in the shape of a pin or nail.

16. The conveyor component monitoring/sensing device as claimed in claim 15, wherein said housing is formed of substantially insulative material, such as hard plastics.

17. A conveyor roller, incorporating the monitoring/sensing device as claimed in claim 8.

* * * * *